United States Patent [19]

Lerner

[11] Patent Number: 5,000,316

[45] Date of Patent: Mar. 19, 1991

[54] OPTICALLY READABLE DISC CASE

[76] Inventor: Adam J. Lerner, 3824 Westfall Dr., Encino, Calif. 91436

[21] Appl. No.: 525,904

[22] Filed: May 18, 1990

[51] Int. Cl.$^5$ .............................................. B65D 85/57
[52] U.S. Cl. .................................... 206/309; 206/804; 312/15
[58] Field of Search ................................ 206/307–313, 206/444, 387, 804; 312/12, 15–19

[56] References Cited

U.S. PATENT DOCUMENTS

| | | | |
|---|---|---|---|
| 3,730,602 | 5/1973 | Campbell et al. | 206/309 |
| 4,705,166 | 11/1987 | Ackeret | 206/309 |
| 4,728,157 | 3/1988 | David, Jr. | 312/12 |
| 4,747,484 | 5/1988 | Ackeret | 206/309 |
| 4,875,578 | 10/1989 | Nehl | 206/309 |

Primary Examiner—Jimmy G. Foster
Attorney, Agent, or Firm—Timothy T. Tyson

[57] ABSTRACT

A case for optically readable disc media such as compact discs, compact disc read only memories and video laserdiscs. A slidable carrier, which holds the disc, is housed inside a flat case. A rib of the carrier is accessible outside the case so that the carrier may be moved within the case. To remove the disc, the carrier is slid to one side which causes the disc to be presented through a flexible pad at the case side wall. The carrier has a hinged hub which allows the disc to be pulled from the case. Installation of the disc is the reverse process.

15 Claims, 3 Drawing Sheets

OPTICALLY READABLE DISC CASE

TECHNICAL FIELD

The present invention pertains to a storage case for disc-like information media. More particularly, the present invention pertains to a storage case for optically readable discs such as compact discs (CD), read only memories (CD-ROM) and video laserdiscs.

BACKGROUND ART

Recent years have seen the development of numerous optically readable discs. The first was the compact disc (CD) for digitally recorded music. Generally 12 centimeters in diameter and 1.2 millimeters in thickness, the disc contains a spiral track much like a standard long playing (LP) music record. Rather than analog information being stored in the side to side movements of the track as with the LP record, however, digital information on the CD disc is stored as minute optical variations in the surface of the track. These variations, in one optical recording technique, consist of surface pits created by a laser beam. It is the length of these pits and the distance between them that is later read by a focused laser beam in a CD player as digital "ones" and "zeros" which are then processed into the original musical signal from which they were derived.

More recently this technique has been extended to compact disc read only memories (CD-ROM) for personal computers. Although they cannot be written to, as with a computer floppy or hard disc, they can store a truly impressive amount of read only information. One example is the complete Webster's Ninth New Collegiate Dictionary, complete with pronunciation, illustrations and geographic place names on one disc. The capability of such storage has also been taken advantage of by using laser discs for storing video information which can then be decoded and displayed on a television set.

While such optically readable discs are relatively rugged and forgiving of minor scratches, dust and debris, they still must be stored and given sufficient protection—scratches that sufficiently scatter the laser beam can block reading of the encoded information. A disc protective container also serves for the display of a label that attracts the buyer and informs the user of the disc. The industry standard CD protective container 20 is illustrated in FIG. 1. It consists of a platform 22 on which the disc 42 is held and a cover 24. The cover 24 is pivotally mounted by means of a hinge 26. The platform 22 has a shallow end wall 28 while the cover 24 has a pair of side walls 30 and 32. Small projections 34 and 36 on the inner surface of each side wall 30 and 32 press into platform holes 38 and 40 to hold the cover 24 in place.

The disc center hole 46 is pressed onto a platform resilient boss 48 while the disc 42 fits into platform depression 50. The platform has reliefs 52 and 54 to aid the user in grasping the disc edge 44 in order to remove the disc 42 from the boss 48 and platform 22, once the cover 24 has been rotated out of the way.

There are several problems presented by this container. Because the cover 24 and platform 22 are molded of clear polystyrene (the platform 22 is actually formed of two parts-one including the boss 48 is usually of polypropylene) it is difficult to distinguish them. Consequently, it is not uncommon for the user, in attempting to grasp the platform 22 with one hand, to mistakenly place the thumb and fingers of that hand on the cover side walls 30 and 32 (thinking them to be parts of the platform) while correctly placing the fingers of the other hand on the platform back wall 56 and lifting, with the thumb of that hand, the cover front border 58. Since both hands are inadvertently holding the cover 24, the container 20 can not be opened.

The proper technique for opening the container 20 is to place the fingers of both hands on the platform back wall 56, the thumb of one hand on the platform end wall 28 and, with the other thumb, lift the cover front border 58. While this works reasonably well, once one is experienced, two problems resulting from the container design, can still cause annoying problems.

The first comes when the hand that lifted the cover 24 is removed to grasp the disc 42. When this is done the cover rotates back, as shown at 24' to where the cover rear border 60 rests on the fingers of the hand still holding the platform back wall 56. This is uncomfortable. If the user moves the figures so as to allow the cover 24' to lie flat in the same plane as the platform 22, there is nothing left for the fingers to hold on to and control of the container 20 is less than complete.

The other problem results from the relative proportions of the platform 22 and cover 24. If the size of a cover relative to the container it is associated with is small, as it is with the familiar audio tape cassette case, one feels comfortable as the cover lifts up because the relative size and mass remains with the container. However, in the design of the industry standard CD container 20, when the cover 24, which is equal in size and mass to the platform 22, pivots upwards the user is often surprised by a sense that the whole container is suddenly moving. The effect can be so unexpected, combined with a resultant change in the center of gravity, as to cause the container to be dropped.

Ironically, in view of the opening difficulties posed by the container 20, it can sometimes open too easily. This problem occurs, when the user attempts to simply lift the container 20 with the fingers and thumb of one hand on opposite cover side walls 30 and 32. The length of the cover 24' affords the mass of the disc 42 and platform 22 considerable leverage and the resultant force overcomes the starting friction of the projections 34, 36 and holes 38, 40. The user suddenly has an open container dangling in space or, worse, a disc falls to the floor.

Still another problem comes when the container 20 is open. It then occupies considerable space since the cover 24' lies in the same plane as the platform 22 and doubles the size of the closed container. If two or three discs are in use at one time, the amount of working area obscured can become quite large.

U.S. Pat. Nos. 3,899,229, 4,046,255, 4,428,480 and 4,493,417 to Ackeret address some of the opening difficulty problems described above by the use of sliding disc holders but still share the problems that result from the case size increasing when in the open state.

U.S. Pat. Nos. 4,422,034 and 4,655,344 to Ackeret and U.S. Pat. No. 4,875,578 to Nehl are containers for multiple discs in which hinged slides are employed to reduce the size of the open container but these solutions are only partially successful.

U.S. Pat. No. 4,463,849 to Prusak shares the problem of increased size in the open state with the industry standard container but adds strips of material as brushes to clean dust and debris from the container walls. However, the brushes do not remove the contaminants from the disc itself.

Because of the problems reviewed above and the growing use of optically readable discs, it can be seen that a container that would open easily and safely, be obvious in the method of its use, and not use any more space, when open, than a disc itself, would be of considerable utility.

DISCLOSURE OF INVENTION

Accordingly, one advantage of the present invention lies in the fact that when "open", it occupies barely more space than when closed. This results from the unique design of a carrier which holds the disc and is slidably mounted in a case. The carrier is essentially one half the size of the disc yet holds it securely within the case. To make the disc accessable for use, the carrier is slid sideways in the case, towards a case wall that is closed by a flexible pad. The disc thus protrudes from the case and is easily removed, yet the carrier is basically still within the case and the "open" size is approximately that of the case itself.

Another advantage of the present invention is its stability during the opening operation. An extension of the carrier cooperates, in a small adjoining second compartment, with a guide structure which controls the carrier as it approaches the case wall from which the disc may be extracted. This guide structure stabilizes the movement of the carrier and relieves the user of any need to control the process of opening as with a large cover. A rib, part of the carrier, runs on the guide structure. The rib may be serrated to secure the grip of the user's thumb as it moves the carrier back and forth within the case. The exterior design of the guide structure and rib is such as to give the user, at a glance, an intuitive feel for how to move the disc in and out of the case. This enhanced understanding of the use of the case is another advantage of the present invention.

The carrier has a circular recess in its upper surface which receives the disc. Small lips extend radially inward from the edge of this recess and the disc edge is held between the lips and the surface of the recession. Securing of the disc within the case is completed by a circular hub that rises from the surface of the recess and fills the center hole of the disc. When the carrier is moved to the side wall of the case for disc extraction, the hub, which is hinged with respect to the rest of the carrier, extends over the edge of the case side along with the disc. When the user grasps the disc and pulls to remove it, the pressure of the disc center hole on the hub causes it to rotate downward and smoothly release the disc in response to the user's urging.

When the disc is reinserted into the case it automatically slides into the recess in the carrier where the user's pressure against the disc is transferred to the recess edge and the carrier begins to slide further within the case. The hub, being pressed against the case opening swings upward into the disc center hole, thus resecuring the disc. The ease of removal and reinsertion of the disc is another advantage of the present invention.

In the removal or reinsertion process of the disc, one of the user's hands may hold the case while the other removes or reinserts the disc. Since all movement is within the case, the user never feels any changes taking place and the size of the case in the user's hand never changes. Nor is there any external moving part, such as a large cover, to press against or pinch the hand holding the case. This absence of change in size or center of gravity eliminates the instability problem with the industry standard container while the absence of external moving parts means the position of the hand holding the case never has to be altered. Again, because nothing moves externally to the case, there is no danger of inadvertently opening the case. All of these aspects are advantages of the present invention.

The open wall through which the disc moves is essentially closed with pads which gently brush the surface of the disc both upon removal and insertion. Thus dust and other minute debris is removed from the disc, contributing to its care and preservation.

When the carrier has been returned to its closed position, a tab on a resilient arm located on the rib, fits within a notch in the case. Thus the carrier is secured against any unwanted movement when the case is subjected to the shock and vibration of normal use, which is another advantage of the present invention.

The novel features of the invention are set forth with particularity in the appended claims. The invention will be best understood from the following description when read in conjunction with the accompanying drawings.

MODES FOR CARRYING OUT THE INVENTION

Figure 1:
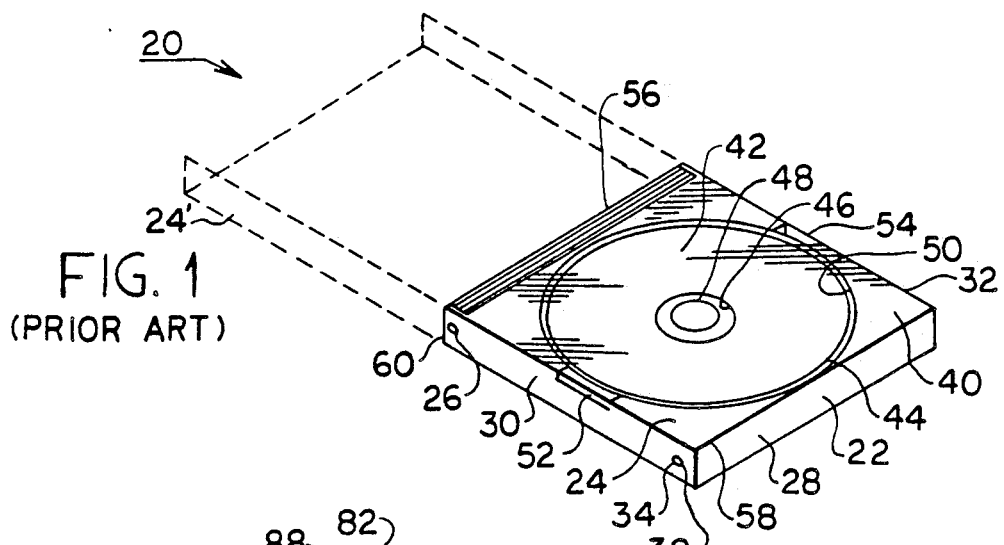
FIG. 1 is a perspective view of an industry standard compact disc container.
Figure 2:
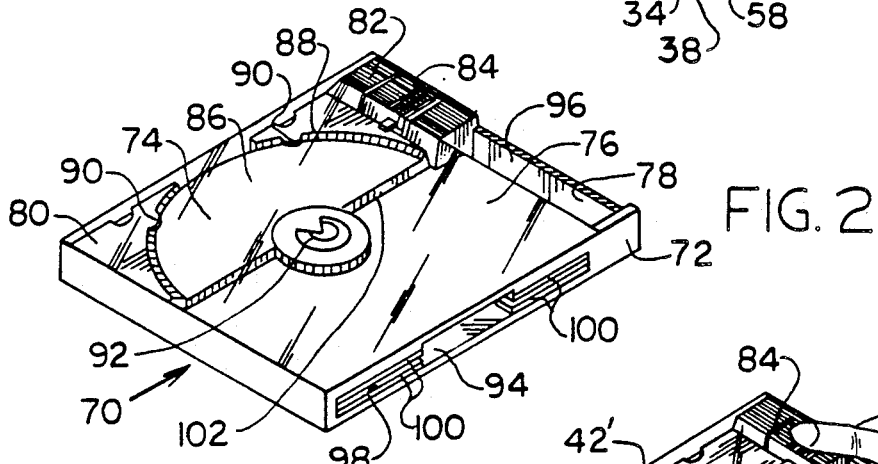
FIG. 2 is a perspective view of a preferred embodiment of the present invention.

FIG. 2 is a perspective view of an embodiment of the invention. The disc 42' to be stored in the case 70 is not shown in order to clearly observe the case 70 details. The case 70 is comprised of a shell 72 and a carrier 74. The shell 72 is divided into a first compartment 76 and a second compartment 78. The first compartment 76 has an open wall 94 with a perimeter 98, while the second compartment 78 has an open wall 96. The carrier 74 has a body 80 and a rib 82. A means for latching, such as a resilient arm 84 is formed as a part of the rib 82. The upper surface of the body 80 contains a recess 86 with an edge 88. Projecting from the edge 88 are lips 90. A hub 92 rises from the upper surface of the carrier 74 adjacent the body side 102. A means for closing the first compartment open wall 94, such as pads 100, is bonded to the perimeter 98. The pads 100 may be made of velvet or the material sold by DuPont under the trademark of Sontara.

The carrier 74 is slidably mounted in the shell 72. The carrier body 80 extends through a slot 104 in a common wall 106 between the first compartment 76 and the second compartment 78 to the rib 82 (slot 104 and common wall 106 are not visible in FIG. 2). The disc 42' (shown in FIG. 3) lies in the recess 86 and the edge of the disc is restrained between the recess 86 and the lips 90. The hub 92 fills the disc center hole and secures it against the recess edge 88.

Figure 3:
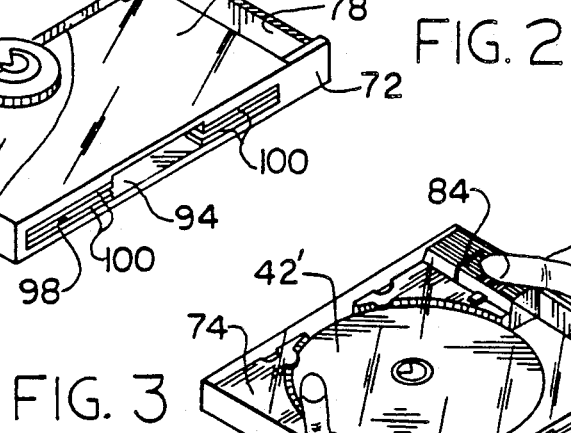
FIG. 3 is a perspective view of a preferred embodiment of the present invention, ilustrating one method of operation.

FIG. 3 is a perspective view of an embodiment of the invention with the disc 42' shown inside. The disc 42' lies on the carrier 74 within the shell 72. A possible method, for a right handed user, of moving the carrier 74 towards the first compartment open wall 94 is illustrated. The left hand LH holds the shell 72 while the thumb of the right hand RH presses down to release the arm 84. At the same time the thumb presses outward to slide the carrier 74 within the shell 72.

Figure 4:
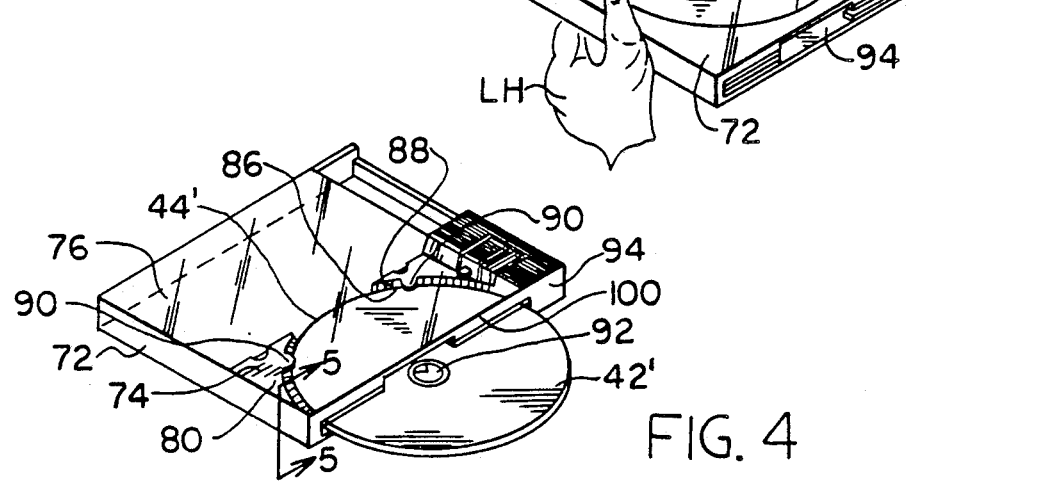
FIG. 4 is a perspective view of a preferred embodiment of the present invention, illustrating the removal or insertion of a disc therein.

FIG. 4 is another perspective view of an embodiment of the invention in which the carrier 74 has been moved adjacent the first compartment open wall 94. The disc 42' and the hub 92 are shown protruding through the pads 100 lining the first compartment open wall 94. The disc edge 44' is restrained between the lips 90 and the recess 86 while the hub 92 presses the disc 42' against the recess edge 88. In this "open position" the carrier body 80 remains within the shell first compartment 76. From the position shown the disc 42' can either be removed or slid, along with the carrier 74, into the shell 72 for storage.

Figure 5:
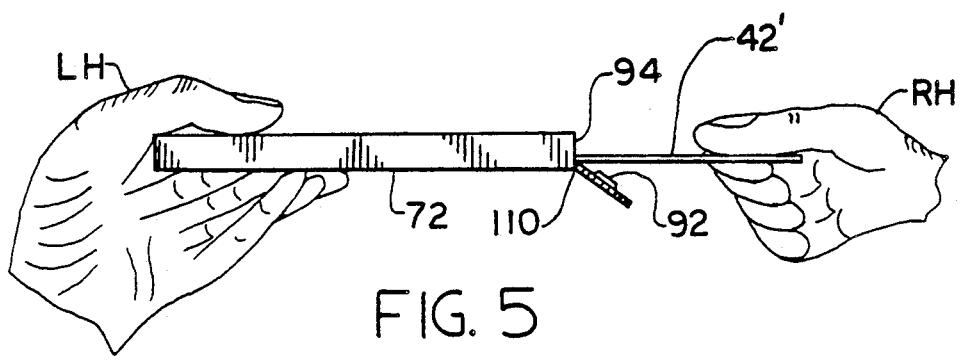
FIG. 5 is an elevation view of a preferred embodiment of the present invention, illustrating the removal or insertion of a disc therein.

FIG. 5 is a side elevation view taken along the line 5—5 in FIG. 4 and illustrating one method of removing the disc 42' once it has been projected through the first compartment open wall 94 as shown in FIG. 4. As the user's left hand LH holds the shell 72, the right hand RH pulls the disc 42' out and away from the shell 72. The hub 92, under pressure of the disc center hole 46' (not shown), is rotated down at its hinge 110 allowing the disc 42' to exit the carrier 74 (shown in FIG. 4) within the shell 72.

Figure 6:
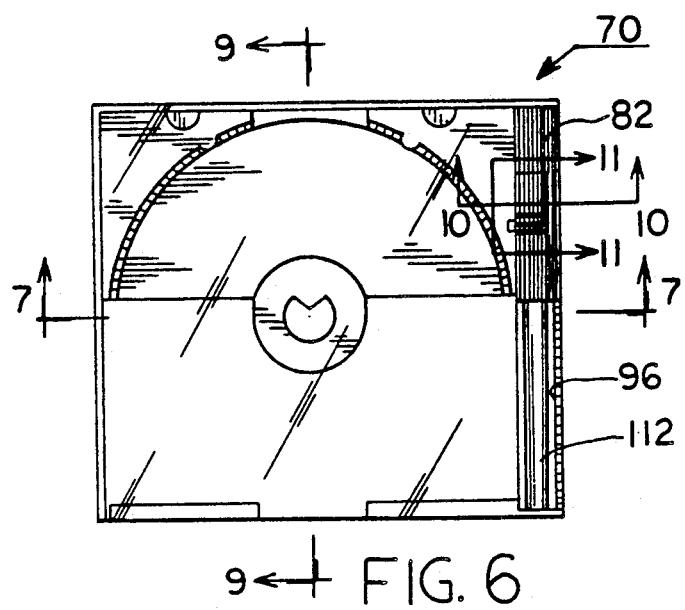
FIG. 6 is a plan view of a preferred embodiment of the present invention.

FIG. 6 is a plan view of the case 70 without the disc 42' installed. The carrier rib 82 is located in the shell second compartment 96. Means for guiding the carrier rib 82, and hence the carrier 74, is a guide rail 112 in this embodiment.

Figure 7:
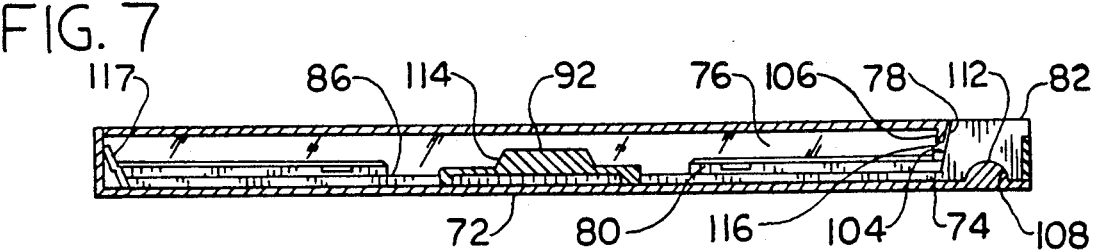
FIG. 7 is a view along the line 7—7 in FIG. 6.

FIG. 7 is a sectional view taken along the line 7—7 in FIG. 6. The guide rail 112 is a molded part of the shell 72 in the shell second compartment 78. The shell second compartment 78 and the shell first compartment 76 share a common wall 106. The common wall 106 has a slot 104 through which the carrier body 80 extends. The slot 104 has a margin 116. In this embodiment the cross section of the guide rail 112 is semi-circular. The carrier rib 82 has a groove 108 of similar shape so that the rib 82 cooperates closely with the rail 112 as the carrier 74 slides within the shell 72. The hub 92 rises from the recess 86 and has an outer rim 114. The outer portion of the carrier body 80 has a skirt 117 which keeps the body 80 from riding upwards inside the shell first compartment 76.

Figure 8:
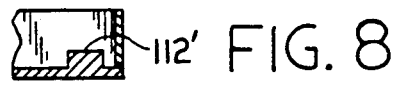
FIG. 8 is a view of another preferred embodiment of the area 8 in FIG. 6.

FIG. 8 is a portion of FIG. 7 showing another embodiment of the guide rail 112 in which its cross section is rectangular.

Figure 9:
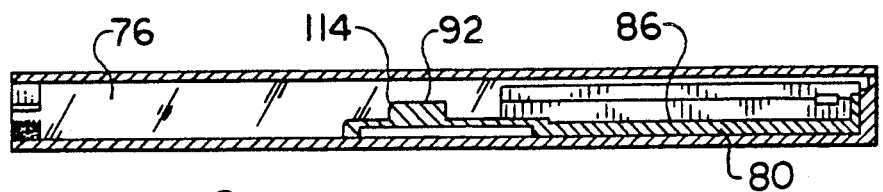
FIG. 9 is a view along the line 9—9 in FIG. 6.

FIG. 9 is a view along the line 9—9 in FIG. 6. The carrier body 80 lies within the shell first compartment 76. The hub 92 rises from the recess 86 to an outer rim 114.

Figure 10:
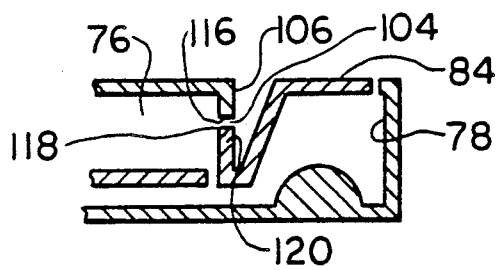
FIG. 10 is a view along the line 10—10 in FIG. 6.

FIG. 10 is a view taken along line 10—10 in FIG. 6. The common wall 106 between the shell first compartment 76 and second compartment 78 is shown. The common wall 106 has a slot 104 which has a margin 116. A notch 118 in the margin 116 is filled by a tab 120 on the resilient arm 84.

Figure 11:
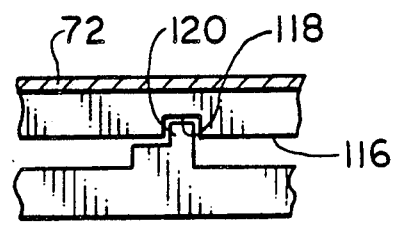
FIG. 11 is a view along the line 11—11 in FIG. 6.

FIG. 11 is a view taken along line 11—11 in view 6. Notch 118 in margin 116 is filled by tab 120. When the tab 120 is in the position shown, the carrier 74 (shown in FIG. 6) can not move relative to the shell 72. When the resilient arm 84 (shown in FIG. 10) is pressed down so that the tab 120 disengages the notch 118, the carrier 74 is free to move relative to the shell 72.

Figure 12:
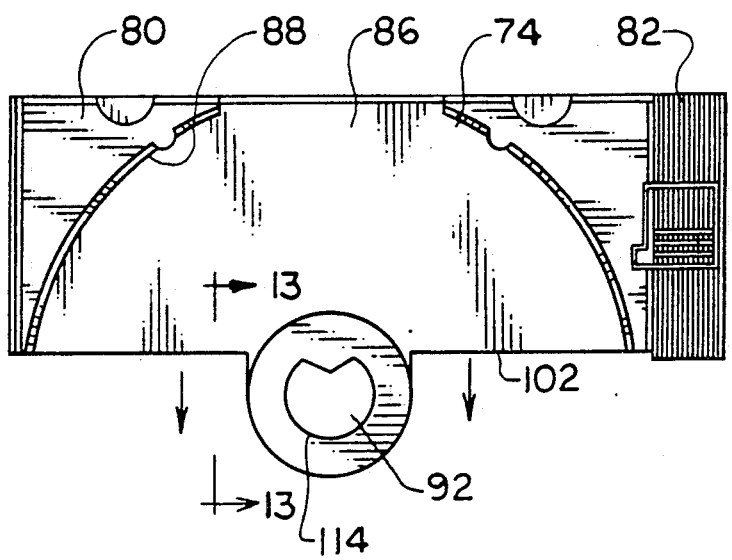
FIG. 12 is a plan view of the carrier body 80.

FIG. 12 is a plan view of only the carrier body 80. The recess 86 has an edge 88. As shown, the shape of the edge 88 is that of a segment of a circle so as to closely fit a disc 42' when it is laid upon the recess 86. The segment's open side faces the body side 102. The segment in this embodiment is less than or equal to 180 degrees. The reason for this limit is seen from FIG. 12 where the two arrows show the direction of travel of the disc 42' (shown in FIG. 5) as it leaves the carrier body 80. If the segment were greater than 180 degrees, removal of the disc 42' would be inhibited.

The hub 92 in FIG. 12 has an outer rim 114. The shape of the outer rim 114 is that of a segment of a circle. The segment's curved side faces the body side 102. The segment in this embodiment is greater than or equal to 180 degrees. The reason for this limit is that the segment has to be greater than 180 degrees in order to press against the disc center hole 46' (not shown) so as to hold the disc 42 against the edge 88. On the other hand, if the segment is a full 360 degrees the hub 92 has to protrude farther from the case 70 when the carrier 74 is against the first compartment open wall 94. This reduces the width of the carrier 74 and hence, the length of the rib 82. The length of rib 82 enhances the stability of its movement along the guide rail 112.

Figure 13:
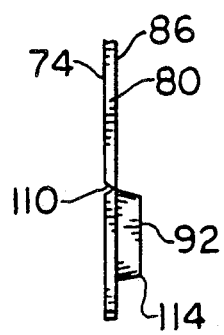
FIG. 13 is a view along the line 13—13 in FIG. 12.

FIG. 13 is a view along the line 13—13 in FIG. 12. Hub 92 rises to its outer rim 114 from the recess 86 in the carrier body 80. The hinge 110 allows the hub 92 to rotate downward when it protrudes from the first compartment open wall 94 as shown in FIG. 5. The hinge may be a "film link" in the carrier 74 when the carrier 74 is molded from a suitably resilient material. This material could be a polyolefinic thermoplastic such as polypropylene. The shell 72 may be molded from a thermoplastic such as polystyrene.

Although the present invention has been described with reference to preferred embodiments, numerous modifications and rearrangements can be made with the equivalent result still embraced within the scope of the invention.

What is claimed is:

1. A case for storing a disc, comprising:
   a shell having first and second compartments; said compartments having a common wall, said common wall having a slot, each said compartment also having an open wall, said first compartment open wall having a perimeter;
   a carrier, slidably mounted in said shell, said carrier having a body and a rib, said body adapted to carry the disc in said first compartment, said body extending through said slot to said rib in said second compartment; and
   means, located in said second compartment, for guiding said rib as said carrier slides towards said first compartment open wall, the disc thus made available for extraction through said first compartment open wall.

2. A case as defined in claim 1, further comprising means, located on said rib, for latching said carrier to said shell so as to prevent relative movement of said carrier and said shell, said latch means releasable to allow said carrier to slide towards said first compartment open wall.

3. A case as defined in claim 2, further comprising means, mounted on said perimeter, for closing said first compartment open wall, said closure means flexible to allow the disc to protrude through said first compartment open wall when said carrier slides towards said first compartment open wall.

4. A case as defined in claim 1 wherein said body, in said first compartment, has a recess, said recess having an edge, said edge generally having the shape of a segment of a circle so as to closely fit the disc carried thereon, said segment being less than or equal to 180 degrees, said segment open side facing said shell first compartment open wall, the disc thus available for extraction from said body through said first compartment open wall.

5. A case as defined in claim 4 wherein at least one lip extends radially inward from said recess edge, the disc edge thus loosely captivated between said carrier recess and said lip.

6. A case as defined in claim 5 wherein said body has a side adjacent said first compartment open wall, said side having a raised hub adapted to closely fit the center hole of the disc and thus position the disc against said carrier recess edge, said hub having an outer rim, said outer rim generally having the shape of a segment of a circle, said segment greater than or equal to 180 degrees, the curved portion of said segment facing said first compartment open wall, said hub having a hinge, said hinge allowing said hub to drop down from the plane of said body when said body is positioned so that said side extends through said first compartment open wall, the disc thus available for extraction from said first compartment open wall.

7. A case as defined in claim 1 wherein said guide means comprises said second compartment having a guide rail, said guide rail running generally perpendicular to said first compartment open wall, said guide rail having a generally constant cross section and said rib having a groove of similar cross section, said groove in close cooperation with said guide rail as said carrier slides towards said first compartment open side.

8. A case as defined in claim 7 wherein said guide rail cross section is generally semi-circular.

9. A case as defined in claim 7 wherein said guide rail cross section is generally rectangular.

10. A case as defined in claim 2 wherein said latch means comprises said common wall slot having a margin, said margin having a notch and said rib having a resilient arm, said arm having a tab which extends into said notch, movement of said carrier with respect to said shell thus prevented except when said resilient arm is depressed to a position where said tab disengages said notch.

11. A case as defined in claim 3 wherein said closure means comprises pads bonded to said perimeter, said pads generally closing said open wall, dust and debris thus prevented from entering said first compartment, dust and debris thus removed from the disc by said pads when the disc is moved through said open side.

12. A case as defined in claim 11 wherein said pads are of velvet material.

13. A case as defined in claim 11 wherein said pads of Sontara material.

14. A case for storing a disc, comprising:
a shell having first and second compartments, said compartments having a common wall, said common wall having a slot, said slot having a margin, said margin having a notch, each said compartment also having an open wall, said first compartment open wall having a perimeter;

a carrier, slidably mounted in said shell, said carrier having a body in said first compartment, said body having a recess, said recess having an edge, said edge generally having the shape of a segment of a circle so as to closely fit a disc carried upon said recess, said segment being less than or equal to 180 degrees, said segment open side facing said first compartment open wall, the disc thus available for extraction from said body through said first compartment open wall, said body also having at least one lip extending radially inward from said recess edge, the disc edge thus loosely captivated between said recess and said lip;

said body having a side adjacent said first compartment open wall, said side having a raised hub adapted to closely fit the center hole of the disc and position the disc against said carrier recess edge, said hub having an outer rim, said outer rim generally having the shape of a segment of a circle, said segment greater than or equal to 180 degrees, the curved portion of said segment facing said first compartment open side, said hub having a hinge, said hinge allowing said hub to drop down from the plane of said body when said body is positioned so that said side extends through said first compartment open wall, the disc thus available for extraction from said first compartment open wall;

said carrier having a rib in said second compartment, said body extending through said slot to said rib, said rib having a groove generally perpendicular to said first compartment open wall, said groove having a generally semi-circular cross section;

said rib having a resilient arm, said arm having a tab which extends into said rim notch, movement of said carrier with respect to said shell thus prevented except when said resilient arm is moved to a position where said tab disengages said notch; and pads of velvet material bonded to said perimeter, said pads generally closing said first compartment open wall, dust and debris thus prevented from entering said first compartment, dust and debris thus removed from the disc when the disc is moved through said first compartment open wall.

15. A case as defined in claim 14 wherein said pads are of Sontara material.

* * * * *